United States Patent [19]
Delery et al.

[11] Patent Number: 4,749,206
[45] Date of Patent: Jun. 7, 1988

[54] LEAF SUSPENSION, PARTICULARLY FOR AUTOMOBILE VEHICLES

[75] Inventors: Marc Delery, 211 rue Benjamin Delessert, 69300 Calurie; Marc Mihailovic, Villeurbanne, both of France

[73] Assignee: Marc Delery, Caluire, France

[21] Appl. No.: 16,792

[22] Filed: Feb. 20, 1987

[51] Int. Cl.⁴ .................................. B60G 11/08
[52] U.S. Cl. .................... 280/104; 280/694; 280/699
[58] Field of Search ............ 280/104, 669, 694, 699, 280/718, 719, 720, 787

[56] References Cited

U.S. PATENT DOCUMENTS

| | | | |
|---|---|---|---|
| 1,384,146 | 7/1921 | Montgomery | 267/40 |
| 2,083,457 | 6/1937 | Ledwinka | 280/719 |
| 2,929,618 | 3/1960 | Hutchens | 280/718 |
| 3,154,323 | 10/1964 | Hooven | 280/718 |
| 3,231,291 | 1/1966 | Kozicki et al. | 280/699 |
| 3,584,892 | 7/1981 | Moore | 280/104 |
| 4,288,096 | 9/1981 | Enokimoto et al. | 280/694 |
| 4,557,500 | 12/1985 | Collard et al. | 280/699 |

FOREIGN PATENT DOCUMENTS

| | | | |
|---|---|---|---|
| 654731 | 12/1937 | Fed. Rep. of Germany | 280/104 |
| 602509 | 3/1926 | France | 280/699 |
| 949761 | 2/1949 | France | |
| 2552718 | 4/1985 | France | |
| 2160616 | 12/1985 | United Kingdom | |

*Primary Examiner*—Ross Weaver
*Attorney, Agent, or Firm*—Parkhurst & Oliff

[57] ABSTRACT

This invention relates to a suspension for vehicles, wherein the wheels are associated with the bodywork by means of a flexible assembly essentially constituted by two longitudinal blades and by two transverse blades connected to the bodywork by means of elastically deformable connecting elements, wherein:—the ends of the longitudinal blades and transverse blades are located in two planes spaced apart from each other, these two planes being parallel or not;—at the front of the chassis, the ends of the longitudinal blades are mounted so as to allow a momentary longitudinal displacement under the effect of a shock and to avoid any transverse or angular displacement;—at the rear of the chassis, the ends of the longitudinal blades are blocked in torsion in the hubholder elements.

11 Claims, 5 Drawing Sheets

LEAF SUSPENSION, PARTICULARLY FOR AUTOMOBILE VEHICLES

The present invention relates to a novel type of suspension for automobile vehicles in particular, allowing normal use (comfort, road-holding in a curved and straight course, speed, . . .) of the vehicle both on the highway or motorway, and intensively for cross-country or off-the-highway, without any specific adaptation or adjustment.

It is well known that automobile vehicles must comprise a system of suspension intended to transmit to the axles the weight of the vehicle and allowing the shocks due to the unequal roadway to be damped.

In other words, a suspension is an assembly of parts connecting suspended elements (body of the vehicle) to non-suspended elements (wheels), this assembly making it possible to dampen the shocks due to the displacement of said wheels. At the present time, conventional suspensions assemblies employ assemblies comprising long and short arm suspensions, leaf springs, helical springs, torsion bars, pneumo-oil springs, . . . Furthermore, in order to eliminate oscillations and to improve comfort and road-holding, the suspensions are associated with damping systems, for example hydraulic, which may necessitate, for off-the-highway, the stacking of spring leaves, damping then being partly completed by the friction between said leaves.

Suspensions developed up to the present time are satisfactory from the standpoint of the comfort and road-holding that they procure, but it must be admitted that technical production thereof is complex and conseqeuntly expensive. Furthermore, when used off-the-highway or, in the case of clearing an obstacle which is unforeseeable on a good highway (bump, pothole, level crossing, curb, . . .), it is imperative that the elements forming the suspension can "absorb" the shocks without breaking. Consequently, the suspension elements are generally overdimensioned, reinforced, which not only renders the vehicle heavier, but also increases dimensions and the price of such assemblies. In addition, a part of the energy is not absorbed, this bringing about stresses on the body-frame and/or the chassis of which the structure must be reinforced in order to resist these stresses.

From all the types of suspension used, none, up to the present time, has given entire satifaction when it is desired to produce a vehicle for polyvalent highway/cross-country use, such use tending to develop more and more. In fact, for such a polyvalent use, this involves making a suspension which not only enables the shocks to be damped when used cross-country, but also to resume an excellent road-holding on asphalt, immediately without any adjustment nor specific adaptation. Such technically contradictory conditions involve suspension diagrams which are characterized in particular by large clearances, springs with progressive flexibility and very long triangulations which do have the advantage of maintaining the correct geometry of the wheels but also have the drawback of transmitting to the body-frame or to the chassis efforts amplified by the length of their lever arm.

At the present time, the best compromise for such a polyvalent use is for example the one found on vehicles manufactured by the firm CITROEN and on which suspension is of the type with "four independent hydropneumatic wheels", in which the front and rear wheels are connected by conduits in which a mixture of liquid and gas is maintained under pressure. According to this technique, when one wheel strikes against a bump or drops into a hole, the increase or decrease in pressure causes the other wheels to descend or rise so as to maintain the seat of the vehicle as constant as possible.

Among the other principles envisaged for making suspensions, one is particularly attractive by its simplicity. This principle which might be designated by the term "interactive" consists in associating the wheels of the vehicle with the bodywork by means of a flexible assembly which abuts against the four wheels and which is mounted on the chassis so that the stresses exerted on one of the wheels during displacements are transferred onto the other three.

This solution, envisaged for at least forty years, as disclosed in French Pat. No. 949 761 (example illustrated in FIG. 29 of that Patent), consists in using a flexible assembly essentially constituted by two so-called "longitudinal" blades substantially having the length of the wheel base of the vehicle and by two so-called "transverse" blades articulated on said longitudinal blades at their ends, the wheels being connected in conventional manner to the ends of said transverse blades.

The transverse and longitudinal blades are constituted by leaf springs which are articulated on the chassis at the centre of their length for the transverse blades and at suitable points adjacent the centre of their length for the longitudinal blades. The pivot axes of the transverse blades are parallel to the longitudinal axis of the vehicle whilst those of the longitudinal blades are perpendicular to the plane of symmetry of the vehicle. The ends of the longitudinal and transverse blades are articulated on one another and these articulations are connected to the wheels or their suspension devices.

Consequently, when one of the wheels undergoes a vertical displacement, this displacement is transferred to the other wheels so that the movements of the articulations of one diagonal are in the same direction and those of the other diagonal in the opposite direction. Consequently, the plane of the chassis is therefore oriented parallel to the diagonals joining the supporting points, without this resulting in any modification on the loads distributed on the longitudinal and transverse blades (springs), therefore without any effort of twisting on the vehicle.

However, such a system of suspension has not been developed on an industrial scale up to the present time, which may be explained for different reasons.

Firstly, until composite materials appeared (materials based on glass fibers, polyurethane foam, structural glue, rubber and elastomer plates, . . .), it would have been necessary, in order to make the longitudinal and also the transverse blades intended to form the frame incorporated in such a suspension, to employ metal plates which, as a function of the characteristics to be obtained (stiffness, deflection under load, . . .), would have led to assemblies having an inacceptable weight.

Furthermore, in the prior known solutions, the transverse and longitudinal blades are joined at their respective ends in one and the same plane. A true flexible, oscillating and interactive "frame" is thus produced, which, from an industrial point of view, is not economical nor reliable and presents a certain number of drawbacks, for example:

A poor geometrical guiding of the wheels in three directions (front-rear, side, topbottom), which necessitates adding different complementary elements in order to ensure triangulation and therefore a correct vertical guiding;

The fact that, if the general plane of the interactive frame is located below the axis of the wheels, in the event of a shock on the front of the chassis, the transverse stiffness of the front and rear transverse blades will be added to the longitudinal stiffness of the longitudinal blades whilst, if the frame passes above the axis of the wheels, the body and/or the floor of the vehicle will be elevated to an inacceptable extent taking into account the camber of the longitudinal blades;

The passage of the transmission shafts, the Universal joints, the gearbox casings and/or rear axle casings is problematic, being given that the transverse blades are located either above these elements and therefore above or in front of the axis of the wheels, or below these elements and therefore below or in front of or to the rear of the axis of the wheels, this involving producing hub-holder elements undergoing high stresses due to effects of overhang;

At the front, the flexibility of the transverse blade will be reduced by the value of the distances separating the longitudinal blades from the hub-holder elements and the front wheels, viz. about the value of one third;

The transverse and longitudinal blades, being by definition deformable in all the planes, in a bend, the wheels will move in a skid with respect to the axis of symmetry of the vehicle, therefore bringing about induced locks.

An improvement to this type of suspension has recently been proposed (French Pat. No. 2 552 718), which improves the efficiency thereof, possibly enabling it to be used without additional damper and facilitating adaptation to vehicles comprising a body-frame obtained by moulding and in particular by thermoforming.

To this end, according to that document, not only the longitudinal and transverse blades are made from a composite material which allows extremely reduced weights with regard to the necessary stiffnesses and which itself performs the role of damper, but also, in the frame formed, the ends of the transverse and longitudinal blades are joined together (and no longer articulated), the ends of the transverse blades being connected to the wheels in conventional manner and the flexible frame thus formed being connected to the bodywork of the vehicle by means of elastically deformable connecting elements (supple bearings) disposed substantially along the longitudinal axis and the transverse axis of the vehicle.

Such an embodiment makes it possible to solve a certain number of problems with respect to the teachings of the prior art, particularly French Pat. No. 949 761, for example concerning shock absorption, the weight of the assembly, but it still presents the same drawbacks as those set forth hereinbefore on pages 5 and 6.

Now, an improvement has been found to this type of suspension, and this is the subject matter of the present invention, which overcomes these drawbacks and allows polyvalent use (normal highway or cross-country).

The invention therefore generally relates to a suspension for vehicle, in particular an automobile vehicle, wherein the wheels of the vehicle are associated with the bodywork by means of a flexible assembly essentially constituted by two longitudinal blades having substantially the length of the wheel base of the vehicle and by two transverse blades of which the ends are connected to the hub-holder elements of the wheels, said longitudinal and transverse blades being connected to the bodywork of the vehicle (or any other element which is fixed with respect to said bodywork, for example gearbox casing, differential or rear axle casing) by means of elastically deformable connecting elements, the suspension according to the invention being characterized in that:

The ends of the longitudinal blades and transverse blades are located in two planes spaced apart from each other, these two planes being parallel or convergent;

At the front of the chassis, the ends of the longitudinal blades are mounted so as to allow a momentary longitudinal displacement under the effect of a shock and to avoid any transverse or angular displacement;

At the rear of the chassis, the ends of the longitudinal blades are blocked in torsion in the hub-holder elements.

According to the invention, the two planes containing the ends of the longitudinal blades and of the transverse blades are preferably located on either side of the plane containing the axes of the wheels.

Thanks to this arrangement on two spaced apart planes of the ends of the transverse and longitudinal blades, the deflection of the transverse blades is thus avoided when the longitudinal blades are stressed in rolling motion. Consequently, the deflections of the transverse and longitudinal blades being independent, this makes it possible to reduce the rolling motion and the rolling motion combined with pumping.

Furthermore, such an arrangement on two spaced apart planes, preferably located, as stated hereinbefore, on either side of the plane determined by the axis of the wheels, enables optimum use to be made of the characteristics of internal damping inherent in the composite materials constituting the longitudinal blades. In fact, upon a shock, for example on the front of the chassis or on a front wheel, the base of the hub-holder elements goes back and oscillates with respect to the vertical. In this way, the front transverse blade is virtually not stressed in the horizontal plane whilst the longitudinal blades absorb by bending and retracting a large part of the energy which is not transmitted to the point of anchoring of the longitudinal blades and a fortiori to the body-frame and/or chassis.

According to the invention, the longitudinal blades are fast at the front with rigid arms articulated from the plane of symmetry of the vehicle and, at the rear, are fast with the rear hub-holder elements in which they are embedded in order to block the movements of torsion produced by the displacement of the front arms and thus to create a restoring torque in torsion. In order to ensure at the front of the chassis a momentary amplitude of displacement in the longitudinal plane, the rigid arms fast with the front ends of the longitudinal blades will be articulated by means of supple elastic links which allow an angular displacement, but virtually no transverse movement which would be capable of disturbing the geometry of the chassis in a bend and during skid of the front wheels. Furthermore, blocking of the rear ends of the longitudinal blades in torsion, for example by embedding in the rear hub-holder elements, makes it possible for the relative angular displacements between the front rigid arms connected from the axis of symmetry of the vehicle to the front wheels and the horizontal plane of embedding in the hub-holder elements, to generate movements of bending but also of torsion on the longitudinal blades. Such an assembly makes it possible to accentuate the progressivity of the deflections by combination with the torsion. Furthermore, holding of the longitudinal blades in torsion may possibly be improved by the presence of a section, for example omega shaped, of profile evolutive within the composite.

At the front, the rigid arms fast with the longitudinal blades and the hub-holder elements must be articulated as close as possible to the plane of symmetry of the vehicle in order that these points do not oscillate further to the rolling movements of the body. The supple articulation which connects the rigid arms to the chassis (or to the body-frame) will preferably comprise damper blocks (elastomer), disposed on either side of the end of the arms and oriented so that said blocks are inclined with respect to the longitudinal axis of the vehicle and are oriented on a line passing through the bearings allowing the connection of the longitudinal blades with the chassis (or the body-frame). This particular arrangement of the rigid arms implies a strict steering diagram, the steering rods being provided at each end with swivel joints, the swivel joints connecting the rack to the rods having to be located as close as possible to the axis of the vehicle and as close as possible to the axis of oscillation of the transverse blade, this so as to be able to oscillate jointly with the front transverse blade. The steering column is preferably mounted to slide in order to follow the movements of oscillation of the rack.

In certain applications, the rear axle casings may also be able to oscillate jointly with the transverse blades. The same applies to rear-drive wheels.

The front transverse blade being disconnected from the longitudinal blades ensures the geometrical guiding of the front wheels, particularly in the horizontal plane in combination with tie-rods, push elements, or triangles for conserving guiding; the plate for anchorage of the tierods or push elements is also fast with the oscillations of the transverse blade.

Fixation of the longitudinal blades and the transverse blades to the body-frame or chassis is effected in a manner similar to teachings of French Pat. No. 2 552 718, i.e. by means of supple bearings enabling them to oscillate in all directions. A pre-stress is possibly made by means of rubber stops, this making it possible to reduce the stiffness of the blades. The point of anchoring of the longitudinal blades to the body-frame is positioned in static longitudinally as a function of the distribution of the masses of the vehicle (front or rear engine), this point being adjustable from front to rear as a function of the variations of loads. It might possibly be provided with a device for automatic variation depending on the pumping and the variations in seat.

Furthermore, it has been observed, particularly when the two longitudinal blades were mounted in forward convergence, that it was preferable to dispose the or each connecting stud so that the axis passing through these studs is oriented in the direction of the resultant force upon a shock, i.e., in general, forming an angle close to 45° with respect to the longitudinal axis of the vehicle.

As material that may be used for manufacturing the longitudinal and transverse blades, materials will be used which not only present characteristics of flexibility (spring function), but also perform per se a function of damping, i.e. are capable of dissipating the energy and the vibrations. Such characteristics are imperative concerning the longitudinal blades whilst, concerning the transverse blades, although such a solution is advantageous, it may possibly be envisaged to make these transverse blades from metal leaves. Among these materials that may simultaneously fulfill these functions (flexibility, spring, damping), mention may be made of the laminated materials obtained by pultrusion, filamentary winding or by pressing, such as those used for manufacturing skis and which are constituted by a complex comprising a central core around which are associated different reinforcing layers, particularly fabrics of glass, aluminium, carbon, aramid, . . . , these different elements being bonded together by a resin. The characteristics of the longitudinal and transverse blades will be determined as a function of the type of vehicle to be produced, particularly its weight, the load that it has to support, the amplitude of the vertical displacements of the wheels.

The invention will be more readily understood on reading the following description with reference to the accompanying drawings, in which.

In the following specification, for the purpose of simplification, the same or equivalent elements are designated by identical references, possibly with the addition of an index.

Figure 1:
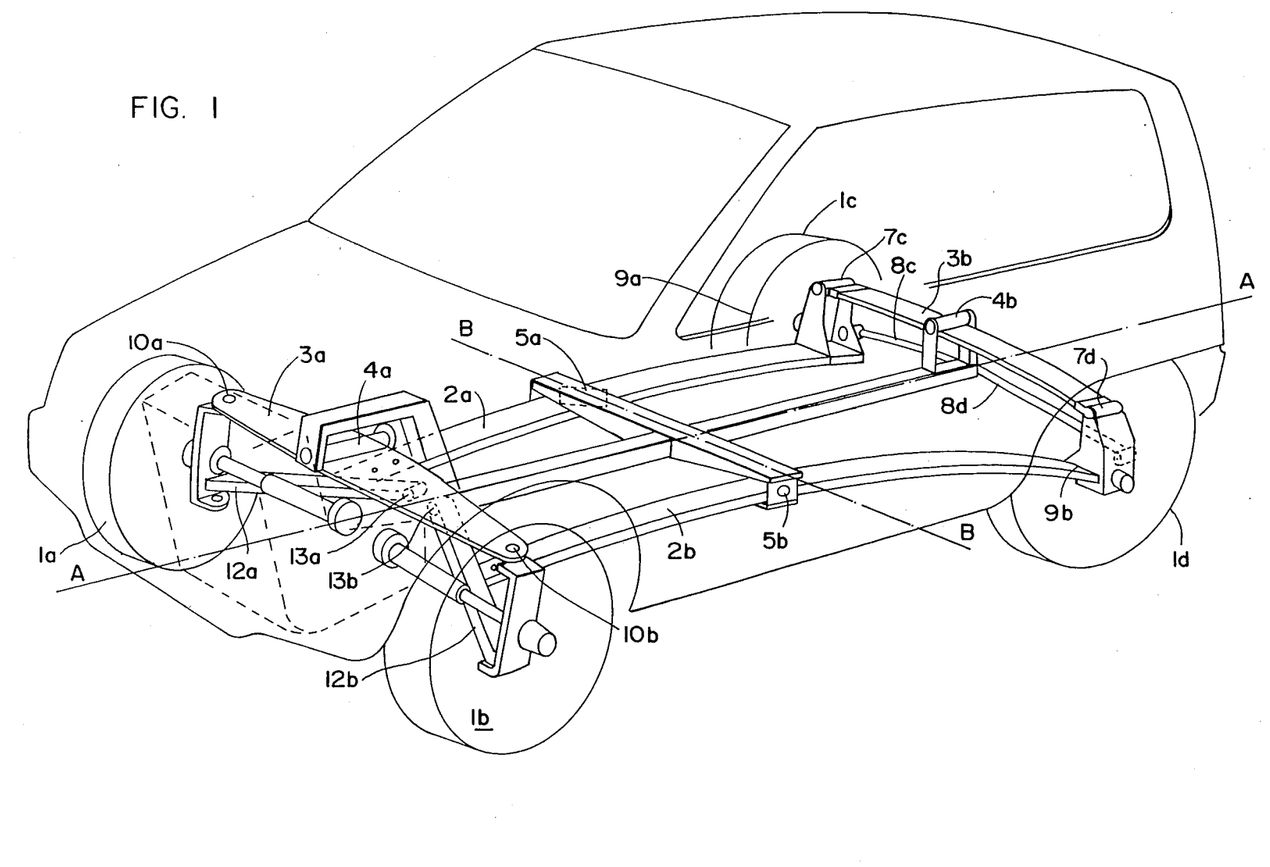
FIG. 1 is a schematic view in perspective of a vehicle comprising a suspension according to the invention, the body-frame being sketched simply for the purposes of simplification.
Figure 2:
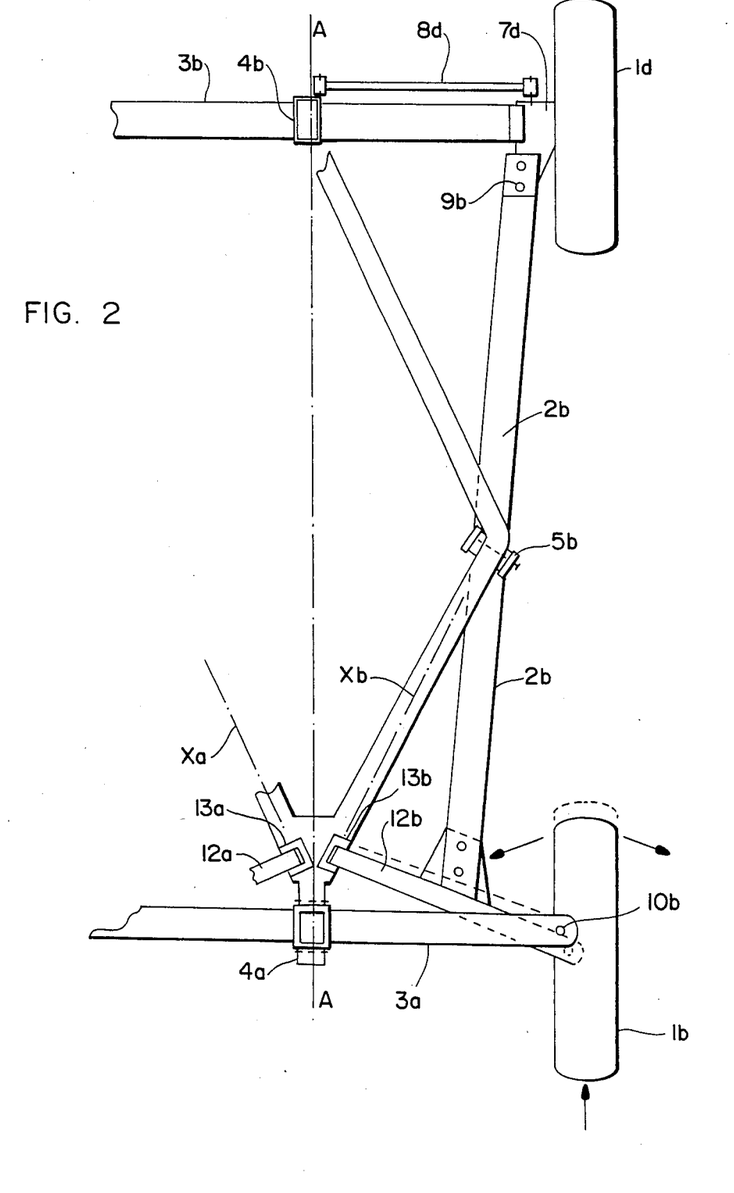
FIG. 2 is a plan view of the suspension of such a vehicle.

Referring now to the drawings, the suspension according to the invention is of the type wherein the wheels $1a$–$1d$ of the vehicle are associated with the bodywork by means of a flexible assembly essentially constituted by two longitudinal blades $2a$, $2b$ having substantially the length of the wheel base of the vehicle and by two transverse blades $3a$, $3b$. These longitudinal blades $2a$, $2b$ and transverse blades $3a$, $3b$ are connected to the bodywork and/or to the chassis of the vehicle, or any other element, for example rear axle, differential and/or gear box casing, fixed with respect to said bodywork, by means of elastically deformable connecting elements $4a$, $4b$, $5a$, $5b$ such as supple bearings which are disposed substantially on the longitudinal axis AA and transverse axis BB of the vehicle. When the longitudinal blades $2a$, $2b$ are slightly convergent (cf. FIG. 2), the lateral studs forming the supple bearings $5a$ $5b$ are preferably disposed so that the axis which passes through said studs is oriented in the direction of the resultant force upon a shock, i.e. in the present case forming an angle close to 45° with respect to the longitudinal axis of the vehicle. These studs may be located on either side of and/or above and/or below the longitudinal blades.

Bearings $4a$, $4b$ are generally disposed substantially along the longitudinal axis whilst bearings $5a$, $5b$ may be more or less offset forwardly or rearwardly as a function of the distribution of the loads.

Figures 5, 7:
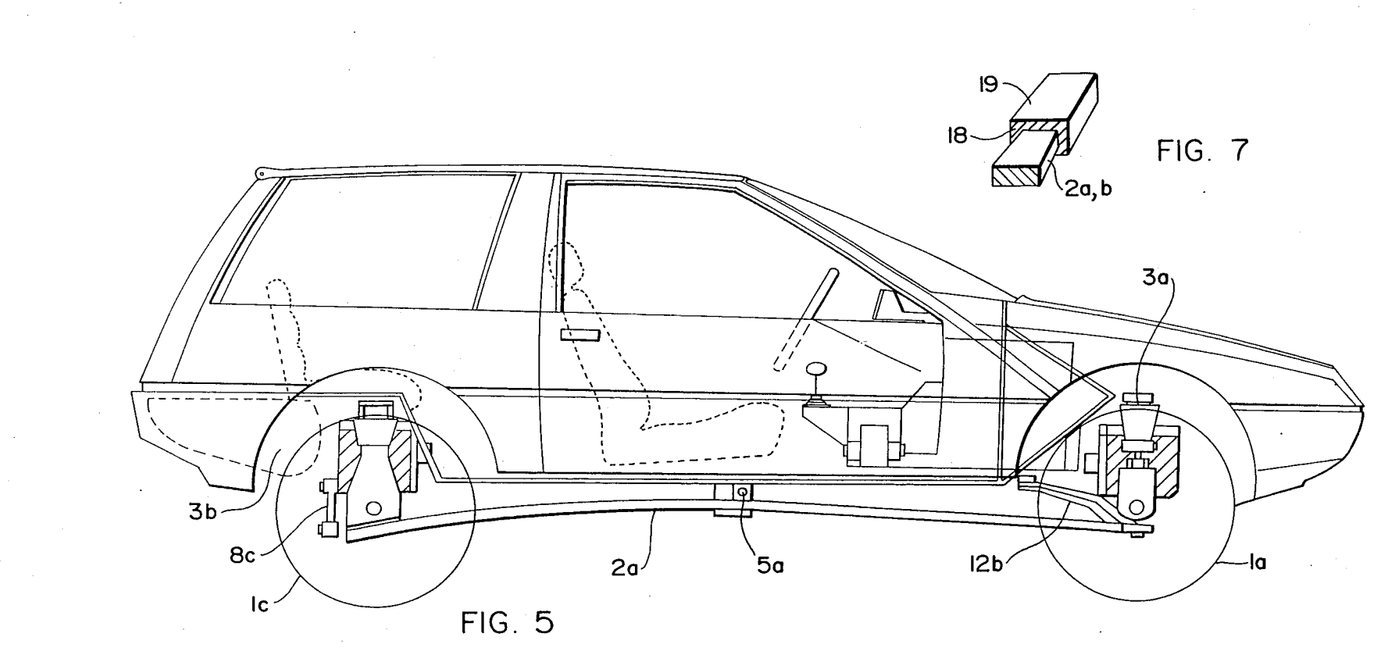
FIG. 5 is a side view of the whole of a vehicle comprising a suspension according to the invention.
FIG. 7 is a partial view showing the manner in which the ends of the longitudinal blades, and even the transverse blades, are fixed.

As shown in FIG. 5, fixation of the transverse blades is obtained by means of a supple bearing comprising an elastomer stud 14 (or any other equivalent damper element, such as for example a liquid or gaseous fluid cushion), this stud 14 being disposed above and/or below the transverse blade 4a or 4b and being maintained between two plates 15, 16 by means of lateral bolts 17.

The longitudinal and transverse blades used for making such a suspension will preferably be made from curved, laminated composite materials, of known type, for example comparable to those used for manufacturing skis, these materials being made either in accordance with the so-called "wet method" technique, the so-called "in-situ injection" technique, or by the "pultrusion" technique, curve of constant section and variable thickness with continuous polymerization by high frequency generator. Laminated materials obtained by filamentary winding may possibly be used. The mechanical characteristics (flexibility, strength, camber, ...) are determined as a function of the type of vehicle, and in particular of the load that it must transport.

According to the invention and contrary to the teachings of the prior art and in particular of French Pat. Nos. 949 961 and 2 552 718, the ends of the longitudinal blades 2a, 2b and of the transverse blades 3a, 3b are not directly connected to one another so as to form a frame, but are, on the contrary, disposed in two planes spaced apart from each other, these planes being parallel or not. The plane passing through the ends of the longitudinal blades and the one passing through the ends of the transverse blades are preferably disposed on either side of the plane containing the axis of the wheels.

Figure 6:
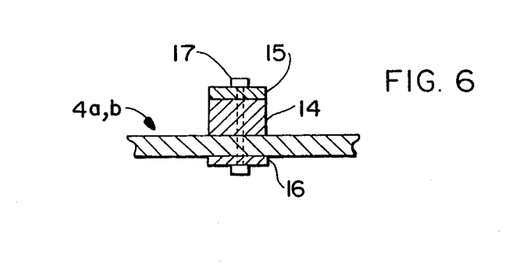
FIG. 6 is a detailed view showing a mode of fixing the transverse blades.

The connection of the ends of the longitudinal and transverse blades, on the one hand to the hub of the front and rear wheels and, on the other hand to the body-frame or chassis, is effected, according to the invention, in the following manner:

If the rear of the chassis is considered, the transverse blade 3b is mounted on the hubholder elements 7c, 7d of each of these wheels, in their upper part, and is fixed along the axis of symmetry AA of the vehicle via the supple bearing 4b preferably having the structure illustrated in FIG. 6 and which was described previously.

Lower guiding rods 8c, 8d connect the chassis to said hub-holder elements and ensure a correct geometry of the displacements of these rear wheels upon vertical displacement thereof.

Still at the rear of the chassis, the ends 9a and 9b of the two longitudinal blades 2, 2b are fixed in rigid manner, for example by means of bolts to the hub-holder elements which are guided in a substantially vertical plane. This fixation of the ends 9a and 9b of the longitudinal blades 2a, 2b is such that they are maintained in a plane located below the plane containing the ends of the rear transverse blade 3b. Such an anchorage of the longitudinal blades in the hub-holder elements of the rear wheels, anchorage effected in rigid manner and without any articulation, enables them to work both in deflection and in torsion. Such fixation is obtained in the manner illustrated in FIG. 7 preferably by embedding the end inside a supple bearing 18 maintained in a fixed metal box 19. Such a supple bearing is usefully used for avoiding a "stamp" effect on the longitudinal blades.

Figure 3:
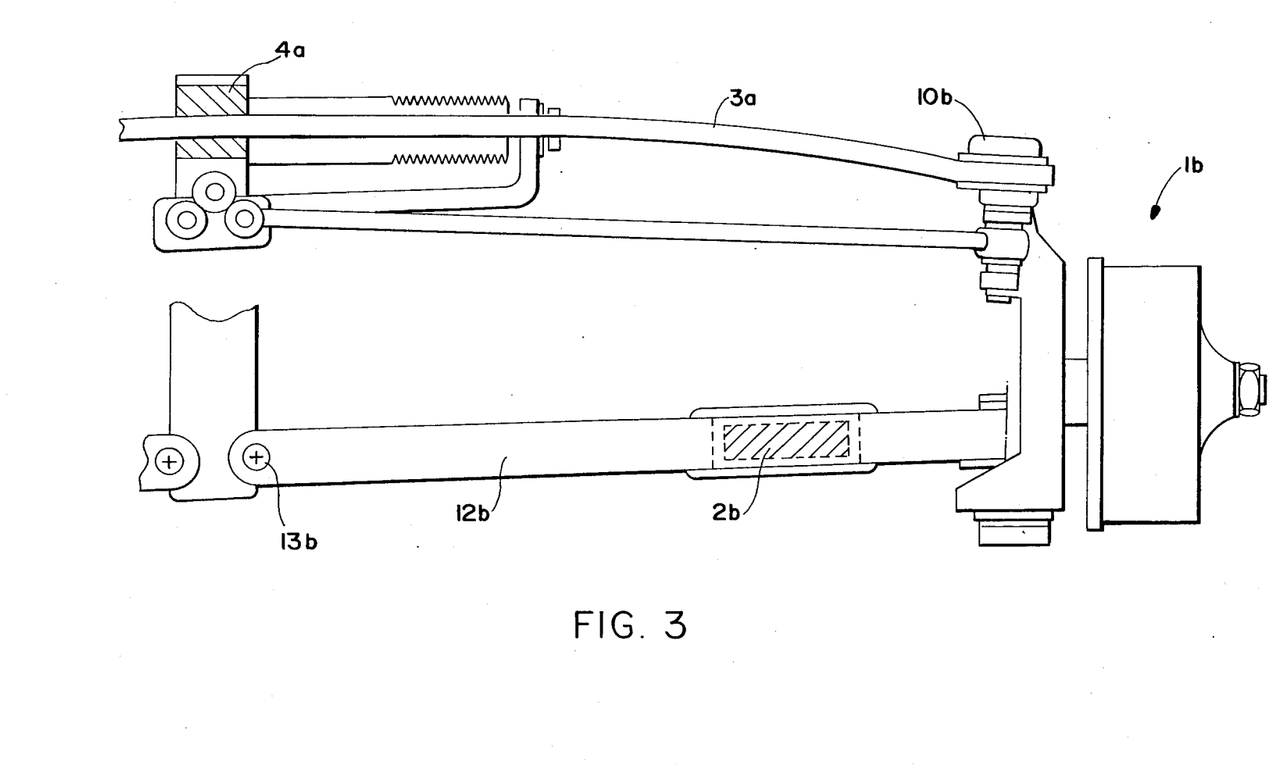
FIG. 3 is a partial front view showing the front chassis of a vehicle according to the invention.
Figure 4:
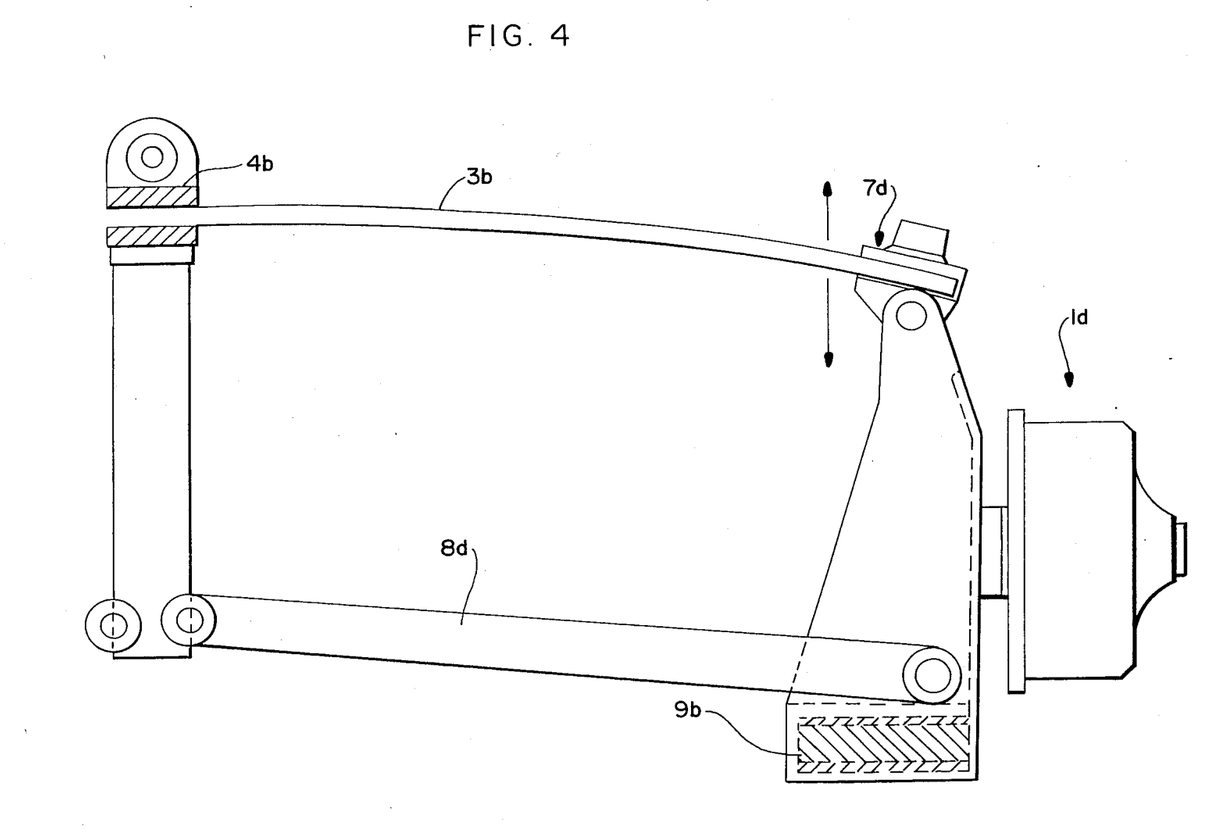
FIG. 4 is a partial front view of the rear chassis of a vehicle equipped with a suspension according to the invention.

Concerning the front of the chassis, the transverse blade 3a is mounted on the rear axle or gearbox casing, the chassis or the body-frame, via a supple bearing 4a (cf. FIG. 6), disposed in the axis of symmetry AA of the vehicle. The ends 10a and 10b of the transverse blades are mounted on the hub-holder element (cf. FIG. 3), in its upper part, via a swivel joint. Furthermore, two arms 12a, 12b connect on the one hand, the body-frame (or chassis) to the hub-holder elements of the two front wheels. These arms are, as shown in the accompanying Figures, on the one hand fixed substantially in the plane of symmetry AA of the vehicle via elastic articulations 13a, 13b and, on the other hand, fixed to each of the hub-holder elements via a lower swivel joint. The elastic articulations 13a are preferably constituted by studs disposed on either side of the end of arms 12a, 12b (cf. FIG. 2). These articulations are preferably constituted so that the studs that it comprises are, if an imaginary axis is passed through these studs, oriented along an axis Xa or Xb passing through the connecting studs 5a or 5b connecting the longitudinal blades 2a or 2b to the chassis or to the body-frame of the vehicle.

The steering rod/rack assembly is fixed to the support of the transverse blade 3a so as to be able to oscillate jointly with this transverse blade.

Finally, the front ends of the two longitudinal blades 2a, 2b are mounted fast with the two connecting arms 12a, 12b in order to ensure a correct geometry. To allow the front (or rear) wheels to be locked, the two longitudinal blades are not parallel but are slightly convergent towards the axis of symmetry of the vehicle.

Such a type of suspension makes it possible, with respect to the prior known solutions, not only to conserve a perfect geometry (diagram) at the front and rear of the chassis during displacements of the wheels, but also to avoid the movements of oscillation of the body-frame and combined movements of rolling-pumping, particularly when taking a bend at high speed, being accompanied by the arms. In this way, the transverse and longitudinal blades perform per se and naturally, without additional element, the functions of anti-roll and anti-pumping. Consequently, such a suspension may, in the case of vehicles intended essentially for use on the highway (private cars or equivalent), allow the elimination of the conventional devices used on such vehicles such as anti-roll bars. Of course, such a suspension is particularly adapted to cross-country vehicles which, in general, must not comprise anti-roll bars, in order to improve adherence.

Moreover, with such a suspension according to the invention, in the case of a shock between an obstacle (pavement curb, bumps, potholes, level-crossing), the wheel, the arm and the longitudinal blades may, due to the elastic connections used as well as the characteristics of the longitudinal blades, absorb this shock by moving back whilst making it possible to resume virtually instantaneously a strict geometry of the front of the chassis after this shock. In this way, by way of comparison, similar tests have been made on a vehicle according to the invention and a vehicle of the "Renault R5" type. By passing the two vehicles over an identical block fixed to the ground, at the same speed, it has been observed, by filming this passage at a speed of 3000 images per second, that, in the case of the R5, upon passage over the block, the tire absorbed a considerable amount of energy and deformed to such a point that the edge of the block came virtually into contact with the rim of the wheel. On the other hand, for the vehicle according to the invention, there is noted, from the beginning of the deformation of the tire, a vertical displacement of the wheel with respect to the chassis and ground. Consequently, in the R5 type vehicle in which the "suspension" function is effected with torsion bars, these latter act only when the tires have attained their limiting deformation. The wheel undergoes a considerable displacement with respect to the rest of the chassis, displacement which is subsequently transferred to the whole of the body-frame of the vehicle.

On the other hand, in the vehicle according to the invention, such a phenomenon is eliminated, damping being effected progressively whilst the longitudinal blades are deformed, accumulating the energy.

Finally, as is clearly shown in FIG. 5, it is possible, thanks to such a type of suspension, to obtain a much greater useful volume by the fact that it is possible to avoid the use of helical springs and additional dampers and having a very compact zone for the motor, the gear-box, the transmission members. Moreover, the absence of spring/damper combinations makes it possible to lower the height of the body belt and of the wing with respect to the maximum vertical clearance of the wheel. It is therefore possible to design vehicles in which the wings and bonnet are considerably downswept, this enabling the CX and the aesthetics to be improved.

The invention is, of course, not limited to the embodiment described hereinbefore but it covers all the variants made in the same spirit. For example, although, in the embodiment given in the present specification, the longitudinal and transverse blades have a parallelepipedic section, it may be envisaged to give them any other section shape (variable or not), as a function of the bending and/or torsional strength, flexibility, ... which it is desired to give them.

Furthermore, the invention may be employed on any type of vehicles, both in mass-produced private cars essentially for highway use, and for vehicles with specific use (mini-cars, vehicles used in factories, golfing cars, . . .), this whether they are with two driving wheels (traction or propulsion), four driving wheels, or even three driving wheels (two at the front, one at the rear).

Moreover, such a type of suspension is particularly adapted for use in vehicles with self-supporting body-frame made of composite material.

Finally, it is possible to modify the shape of the transverse blades, for example by making them by moulding, and to give them a substantially diamond shape, this enabling them to ensure the function of guiding of the wheels without addition of tie-rods or push elements.

Moreover, the framework of the invention would not be exceeded by possibly eliminating one of the transverse blades (front or rear), for example in the case of vehicles whose preponderance of weight is located at the front as well as the drive wheels. In such a case, the transverse blade is, of course, replaced by means allowing guiding of the wheels (rods).

What is claimed is:

1. A suspension for a vehicle comprising wheels and bodywork, the wheels of the vehicle being associated with the bodywork by means of a flexible assembly comprising two longitudinal blades of a length substantially the length of the wheel base of the vehicle and two transverse blades of which the ends are connected to the hub-holder elements of the wheels, said longitudinal and transverse blades being connected to the bodywork of the vehicle by means of elastically deformable connecting elements, wherein
the ends of the longitudinal blades and transverse blades are located in two planes spaced apart from each other, these two planes being parallel or not;
at the front of the chassis, the ends of the longitudinal blades are mounted so as to allow a momentary longitudinal displacement under the effect of a shock and to avoid any transverse or angular displacement;
at the rear of the chassis, the ends of the longitudinal blades are blocked in torsion in the hub-holder elements; and
the longitudinal blades are fast at the front to rigid arms articulated from or in the vicinity of the plane of symmetry of the vehicle and, at the rear, are fast with the rear hub-holder elements in which they are embedded in order to block the movements of torsion of the rear ends thus creating a restoring torque in torsion.

2. The suspension of claim 1, wherein the planes containing the ends of the longitudinal blades and the ends of the transverse blades are located on either side of the plane passing through the axis of the wheels of the vehicle.

3. The suspension of claim 2, wherein the plane of the ends of the longitudinal blades lies substantially below the axis of the front and rear wheels, and the plane of the ends of the transverse blades lies substantially above the axis of said wheels.

4. The suspension of claim 3, wherein at least the longitudinal blades are based on a laminated composite material which not only provides the suspension with characteristics of flexibility, but also performs a function of damping, i.e., the composite material is capable of dissipating all or part of the energy and the vibrations.

5. The suspension of claim 1, wherein the longitudinal blades and the transverse blades are connected to the body-frame or chassis by means of supple bearings enabling them to oscillate.

6. The suspension of claim 5, wherein, particularly when the two longitudinal blades are mounted slightly in forward convergence, the connecting studs of the bearings are disposed so that the axis passing through these studs is oriented in the direction of the resultant force upon a shock, i.e. forming an angle close to 45° with respect to the longitudinal axis of the vehicle.

7. The suspension of claim 6, wherein the supple connecting bearings comprise a damping block maintained in contact with the longitudinal blade or transverse blade by means of two plates, the ends of the longitudinal blades being embedded between the elastomer plates.

8. The suspension of claim 1, wherein the rigid connecting arms fast with the front ends of the longitudinal blades are articulated by means of supple elastic links allowing a determined angular displacement but avoiding any transverse displacement capable of disturbing the geometry of the chassis in a bend and when the front wheels skid.

9. The suspension of claim 8, wherein the rigid arms are fast with the longitudinal blades and the hub-holder elements and are articulated as close as possible to the plane of symmetry of the vehicle, the steering rods being provided at each end with swivel joints, the swivel joints connecting the rack to the rods being located as close as possible to the axis of the vehicle and as close as possible to the axis of oscillation of the transverse blade, so as to oscillate jointly with the front transverse blade, the steering column being mounted to slide.

10. The suspension of claim 1, wherein prestress stops are disposed on or beneath the longitudinal blades and/or the transverse blades in order to modify the initial stiffness of said longitudinal or transverse blades in order, in particular, to oppose the phenomena of rolling.

11. A suspension for a vehicle, the vehicle comprising wheels and a body, each wheel having a hub-holder element, the suspension comprising:

a flexible assembly comprising first and second longitudinal blades, first and second transverse blades, elastically deformable connecting elements and rigid arms, each of said longitudinal blades being of a length substantially the length of the wheel base of the vehicle, the ends of said longitudinal blades at the front of the vehicle being mounted so as to allow momentary longitudinal displacement when subjected to shock and to prevent transverse or angular displacement, the ends of said longitudinal blades at the rear of the vehicle being rigidly fixed to said hub-holder elements, said longitudinal blades being embedded in said hub-holder elements, thereby blocking the torsional movements of the rear of the vehicle, to create a restoring torque in torsion, the ends of each of said transverse blades being connected to said hub-holder elements, said longitudinal and transverse blades being connected to the body of the vehicle by said connecting elements, the ends of said longitudinal blades and the ends of said transverse blades being in different planes, said longitudinal blades being fast at the front of the vehicle to said rigid arms.

* * * * *